US012670753B2

(12) United States Patent
Ballatore et al.

(10) Patent No.: US 12,670,753 B2
(45) Date of Patent: Jun. 30, 2026

(54) VEHICLE PROVIDED WITH AN ELECTRIC-DRIVE AXLE AND WITH A SOUND TRANSMISSION SYSTEM TO TRANSMIT SOUNDS INDICATIVE OF THE OPERATION OF SAID AXLE

(71) Applicant: FERRARI S.P.A., Modena (IT)

(72) Inventors: Marco Ballatore, Modena (IT);
Francesco Carosone, Modena (IT);
Tomas Pedraza, Modena (IT); Antonio Palermo, Modena (IT)

(73) Assignee: FERRARI S.P.A., Modena (IT)

( * ) Notice: Subject to any disclaimer, the term of this patent is extended or adjusted under 35 U.S.C. 154(b) by 284 days.

(21) Appl. No.: 18/470,497

(22) Filed: Sep. 20, 2023

(65) Prior Publication Data

US 2024/0096148 A1 Mar. 21, 2024

(30) Foreign Application Priority Data

Sep. 21, 2022 (IT) ......................... 102022000019326

(51) Int. Cl.
G07C 5/08 (2006.01)
B60K 1/02 (2006.01)
G10K 11/172 (2006.01)
(52) U.S. Cl.
CPC .............. G07C 5/0833 (2013.01); B60K 1/02 (2013.01); G10K 11/172 (2013.01)
(58) Field of Classification Search
CPC ...... G07C 5/0833; B60K 1/02; G10K 11/172; G10K 11/22; G10K 11/002; G10K 11/08; G10K 11/04; G10K 13/00; H02K 5/25; H02K 5/20; H02K 5/04; H02K 5/00; B60W 50/14; B60Q 5/008; B60Q 5/00; B60Y 2200/91
See application file for complete search history.

(56) References Cited

U.S. PATENT DOCUMENTS 5,111,509 A * 5/1992 Takeuchi ............. H04R 1/2849
381/350
7,658,263 B2 * 2/2010 Jasnie .................... G10K 11/22
181/204
(Continued)

FOREIGN PATENT DOCUMENTS

CN 111445896 A 7/2020
DE 102010005067 A1 * 7/2011 ............... B60Q 5/00
(Continued)

OTHER PUBLICATIONS

Italian Search Report for Application No. 102022000019326, Filing Date: Sep. 21, 2022; Date of Mailing: Apr. 13, 2023, 7 pages.

*Primary Examiner* — Steve Clemmons
(74) *Attorney, Agent, or Firm* — CANTOR COLBURN LLP

(57) ABSTRACT

A vehicle has at least one axles with wheels operated by at least one electric motor; a sound transmission system transmits a sound indicative of the operation of the axle inside the passenger compartment; said sound transmission system has at least one acoustic conduit provided with an inlet mouth arranged in the area of the axle and/or of the electric motor and with an outlet opening arranged in the area of the passenger compartment.

11 Claims, 4 Drawing Sheets

(56)  References Cited

U.S. PATENT DOCUMENTS

| | | | |
|---|---|---|---|
| 8,127,888 B1 * | 3/2012 | Mah | G10K 11/22 |
| | | | 123/184.53 |
| 8,322,486 B2 * | 12/2012 | Ohta | F02M 35/1294 |
| | | | 123/184.57 |
| 9,860,667 B2 * | 1/2018 | Barlow, Jr. | B60Q 5/00 |
| 9,994,149 B2 * | 6/2018 | Hillers | G10K 11/22 |
| 10,197,022 B2 * | 2/2019 | Tucker | G10K 11/04 |
| 10,436,085 B2 * | 10/2019 | Pompucci | F01N 1/166 |
| 11,280,303 B2 * | 3/2022 | Christensen | F02D 41/021 |
| 12,170,078 B2 * | 12/2024 | Iossa | G10K 13/00 |
| 2017/0096101 A1 * | 4/2017 | Bailey, III | F16H 63/40 |
| 2017/0107921 A1 | 4/2017 | Seldon et al. | |
| 2018/0328321 A1 * | 11/2018 | Toda | G06F 3/165 |

FOREIGN PATENT DOCUMENTS

| | | |
|---|---|---|
| DE | 202017004205 U1 | 9/2017 |
| WO | 2020249660 A1 | 12/2020 |

* cited by examiner

VEHICLE PROVIDED WITH AN ELECTRIC-DRIVE AXLE AND WITH A SOUND TRANSMISSION SYSTEM TO TRANSMIT SOUNDS INDICATIVE OF THE OPERATION OF SAID AXLE

CROSS-REFERENCE TO RELATED APPLICATIONS

This patent application claims priority from Italian patent application no. 102022000019326 filed on Sep. 21, 2022, the entire disclosure of which is incorporated herein by reference.

TECHNICAL FIELD

The invention relates to a vehicle provided with a passenger compartment, with an electric-drive axle and with a sound transmission system to transmit sounds indicative of the operation of said axle towards the passenger compartment, in order to improve the driver's awareness of the state of the vehicle while driving. In particular, the invention relates to the transmission of sounds emitted by an electric motor operating said axle.

PRIOR ART

As it is known, internal combustion engines used in motor vehicles emit sounds that normally represent a feedback signal for the driver, who can, if necessary, rely on said sounds to adjust the way in which he/she drives the motor vehicle.

In relatively recent times, internal combustion engines have developed a tendency to be combined with or replaced by electric-drive devices, i.e. devices that include at least one electric motor driving the vehicle.

However, during its operation, the electric motor emits relatively weak sounds, which can hardly be perceived inside the passenger compartment.

This leads to a problem concerning a lack of awareness of the driver relative to the operating conditions while driving.

Owing to the above, a sound transmission system is needed, which is capable of transmitting those sounds characterizing electric-drive axles towards the passenger compartment. Furthermore, to this regard, the sound transmission system has to be adjusted, during the designing phase and/or directly during its operation, so as to effectively respond to the needs concerning an acoustic level that is sufficient to reach the awareness of the state of the vehicle.

Therefore, the object of the invention is to fulfil the needs discussed above in a relatively simple and economic manner, for example by reducing or eliminating the use of electric-acoustic apparatuses for transmitting the sounds.

DESCRIPTION OF THE INVENTION

The aforesaid object is reached by a vehicle according to claim 1. At the same time, the dependent claims relate to preferred embodiments of the invention.

BRIEF DESCRIPTION OF THE DRAWINGS

Hereinafter, preferred embodiments of the invention will be described, in order to allow the latter to be better understood, by way of non-limiting example and with reference to the accompanying drawings, wherein.

EMBODIMENTS OF THE INVENTION

Figure 1:
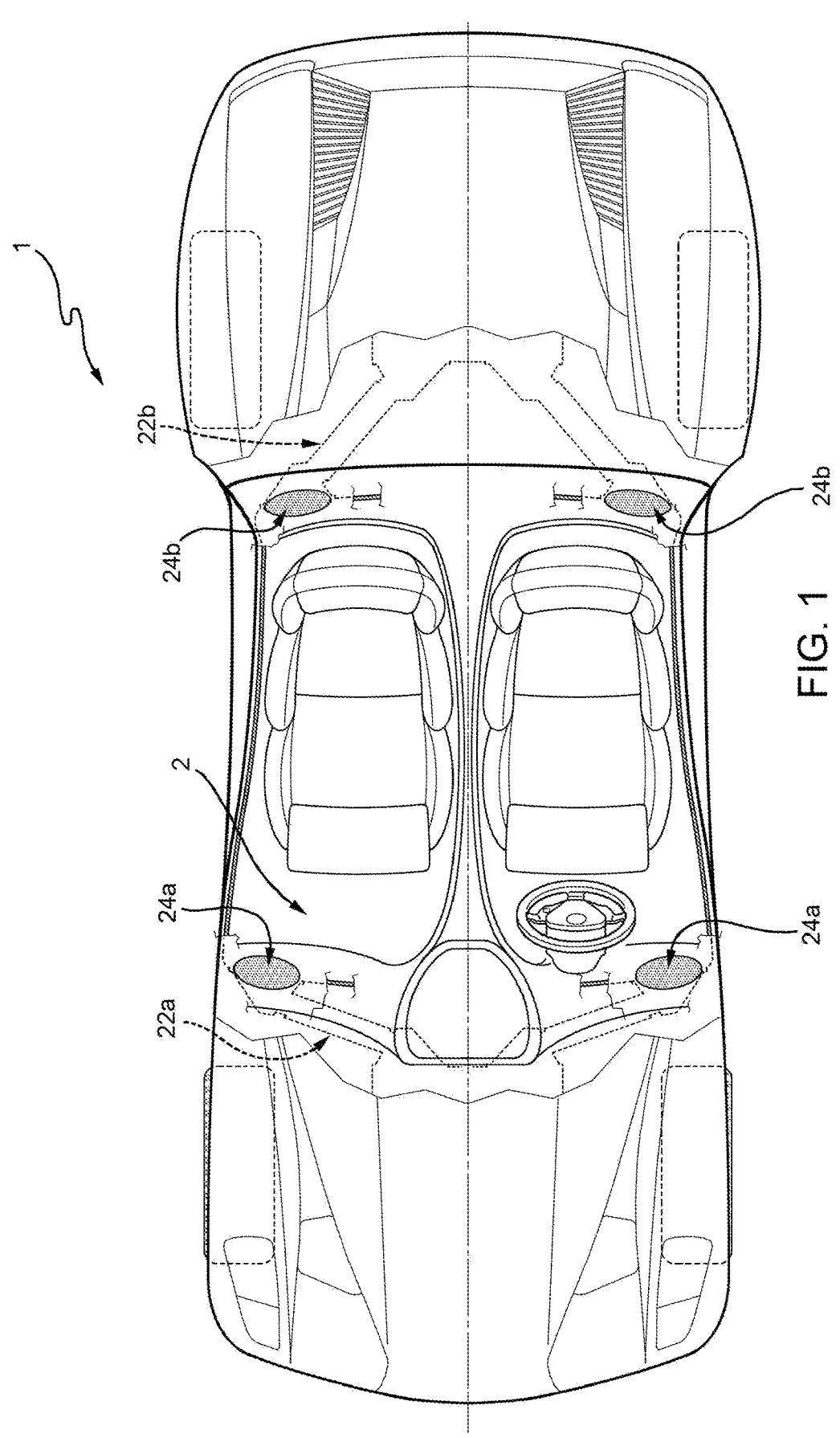
FIG. 1 is a view from the top, with parts removed for greater clarity, of a preferred embodiment of the vehicle provided with an electric-drive axle and with a sound transmission system to transmit sounds indicative of the operation of such an axle, according to the invention.

In FIG. 1, reference number 1 is used to indicate, as a whole, a motor vehicle.

The motor vehicle 1 comprises a passenger compartment 2 having a driver's seat and at least one passenger's seat. With reference to the schematic representation of FIG. 2, the motor vehicle 1 further comprises a front axle 3 and a rear axle 4, each having a pair of wheels indicated with 5 and 6, respectively. The axles 3 and/or 4 are electric-drive axles, namely the wheels 5 and/or 6 are operated by at least one electric motor. In the specific example shown herein, the motor vehicle 1 comprises two electric motors 8, which operate the wheels 6 of the axle 4, for example by means of a relative transmission assembly (which not shown and not described in detail); and one single electric motor 7, which operates the wheels 5 of the axle 3, for example by means of a corresponding transmission assembly (which is not shown and not described in detail).

The configuration of the electric-drive devices used to operate the wheels 5 and/or 6 can anyway be different from the one schematically shown herein (for example, there could be one single electric motor for the electric drive of the entire motor vehicle) and/or the invention could be applied to a hybrid vehicle, namely a motor vehicle having an internal combustion engine combined with at least one electric motor, for the drive of the motor vehicle, instead of being applied to a full electric vehicle like the motor vehicle 1 shown by way of example.

Specifically, the electric motors 7 and/or 8 are electric motors powered with an alternating current; more specifically, they are synchronous motors or permanent magnet motors.

Figure 3:
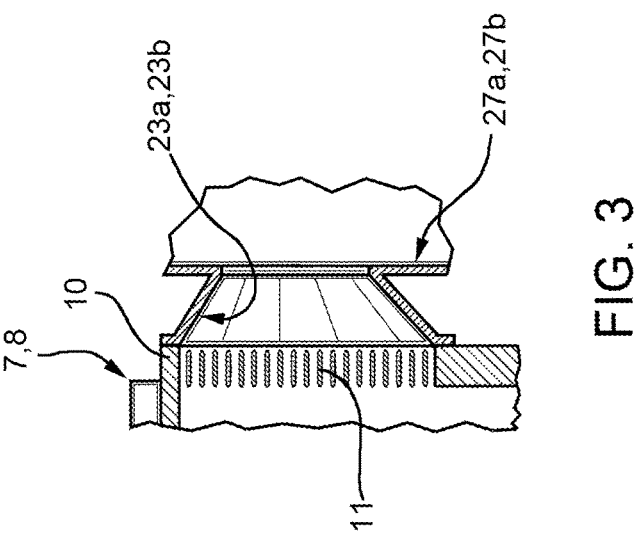

Generally speaking, each one of the motors 7,8 comprises a stator and a rotor, which can rotate and is coaxial relative to the stator; the rotor and the stator are housed in an outer casing, which is shown, in a simplified manner, in FIG. 3 and is indicated by reference number 10.

With reference to FIG. 2 again, according to the invention, the motor vehicle 1 comprises a sound transmission system 21 to transmit, towards the passenger compartment 2, sounds that are indicative of the operation of the axles 3 and/or 4, when they are operated by the electric motors 7, 8.

The system 21 comprise at least one acoustic conduit, namely a pneumatic device defining a channel or passage that, thanks to the air contained on the inside, channels and transmits sounds starting from at least one inlet mouth (arranged in a position facing the sound source emitting the sounds to be transmitted) to at least one outlet opening (arranged in an environment where the transmitted sounds have to be perceived). Preferably, though not exclusively, the aforesaid channel or passage is continuous, namely without interruptions in the presence of air on the inside; in other words, the inlet mouth communicates with the outlet opening through the air contained inside the acoustic conduit and the transmission of sounds takes place thanks to said air, without electric-acoustic apparatuses.

In particular, each one of the axles 3 and 4 can be associated with one or more acoustic conduits, indicated by references 22a and 22b in the example shown herein. The acoustic conduits 22a and 22b have, at an end, respective inlet mouths 23a and 23b arranged in positions facing portions of the axles 3 and 4 and/or in positions facing the electric motors 7 and 8 and, at the opposite end, have respective outlet openings 24a and 24b arranged in the area of the passenger compartment 2. In particular, the outlet openings 24a and 24b are arranged along a wall, which defines the inner space of the passenger compartment 2; more in particular, they are arranged at the lower vertexes of the passenger compartment 2. The outlet openings 24a and 24b can be completely open or they can be partially closed by grids (in order to prevent objects from getting into the acoustic conduits 22a and 22b from the passenger compartment 2), as shown in FIG. 1 in a simplified manner.

With reference to FIG. 3, the inlet mouths 23a, 23b are preferably arranged in a position facing the grids 11 of the casings 10, since said grids define an area where the intensity of the sound emitted by the rotation of the rotor of the motors 7,8 is greater. In particular, the inlet mouths 23a, 23b are coupled, in contact, to the outer casing 10 of the motors 7,8 so as to receive the sound coming out of the grids 11 in the best way possible.

Figure 2:
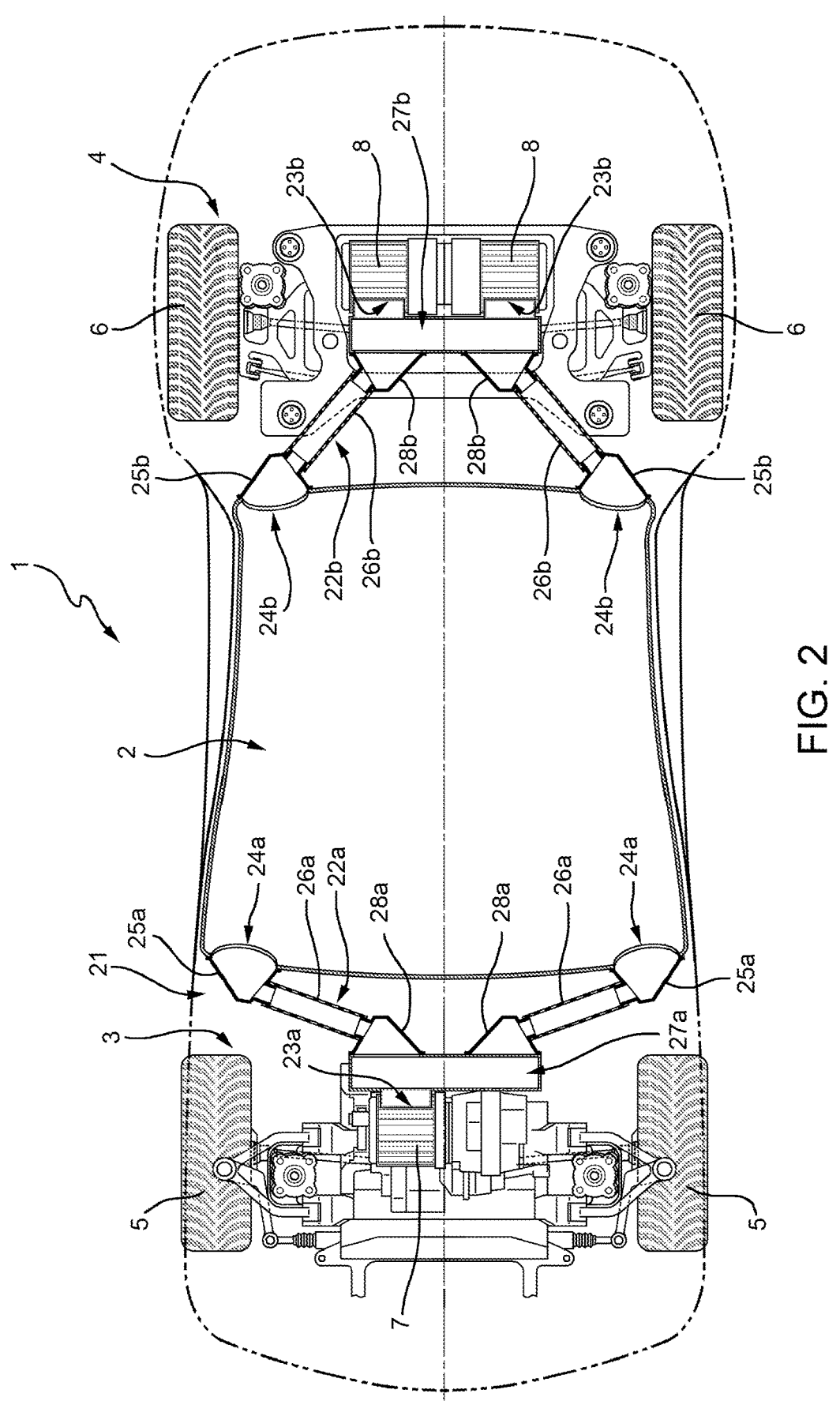
FIG. 2 is similar to FIG. 1 and shows, more in detail and in a schematic manner, the sound transmission system of the vehicle of FIG. 1.

With reference to FIG. 2, the outlet openings 24a and 24b are preferably defined by flared elements 25a and 25b, for example with the shape of a truncated cone or with the shape of a funnel, diverging towards the passenger compartment 2, so as to diffuse and guide the emitted sound.

The acoustic conduits 22a and 22b further comprise respective channels 26a and 26b, which transmit the sounds towards the outlet openings 24a and 24b. The flared elements 25a and 25b can be defined by the outlet ends of the channels 26a, 26b or they can be defined by distinct bodies fixed to the channels 26a, 26b.

In the specific example shown herein, the acoustic conduit 22a comprises two outlet openings 24a, two corresponding channels 26a and one single inlet mouth 23a; on the other hand, the acoustic conduit 22b comprises two outlet openings 23b, two corresponding channels 26b and two inlet mouths 23b, which face the two motors 8, respectively, and communicate with one another and with the two channels 26b (for example, in order to mix the sounds emitted by the two motors 8).

Furthermore, the acoustic conduits 22a and 22b preferably comprise respective sound boxes or resonance boxes indicated by references 27a and 27b, which have a volume, a shape and a material that are chosen during the designing phase so as to amplify sound intensity and, if necessary, set a tone and/or a timbre of the sound transmitted towards the outlet openings 24a, 24b.

In the example shown herein, the sound box 27a establishes a communication between the inlet mouth 23a and both channels 26a; and the sound box 27b establishes a communication between both inlet mouths 23b and both channels 26b. For example, the sound boxes 27a and/or 27b are arranged close to the inlet mouths 23a, 23b; in other words, the inlet mouths 23a, 23b are defined by portions of the sound boxes 27a, 27b or are defined by bodies that are directly fixed to the sound boxes 27a, 27b (without the interposition of other tubes).

The inlets of the channels 26a and 26b are fixed to the sound boxes 27a and 27b though flared elements 28a, 28b, which have, for example, the shape of a truncated cone or the shape of a funnel and diverge towards the sound boxes 27a and 27b so as to gather and channel the amplified sound. The flared elements 28a and 28b can be defined by the inlet ends of the channels 26a, 26b or they can be defined by distinct bodies fixed to the channels 26a, 26b as well as to the sound boxes 27a, 27b.

The channels 26a, 26b advantageously have a volume, a shape, a length and/or a material that can be chosen during the designing phase so as to set a tone and/or timbre of the sound transmitted to the outlet openings 24a, 24b.

Figure 4:
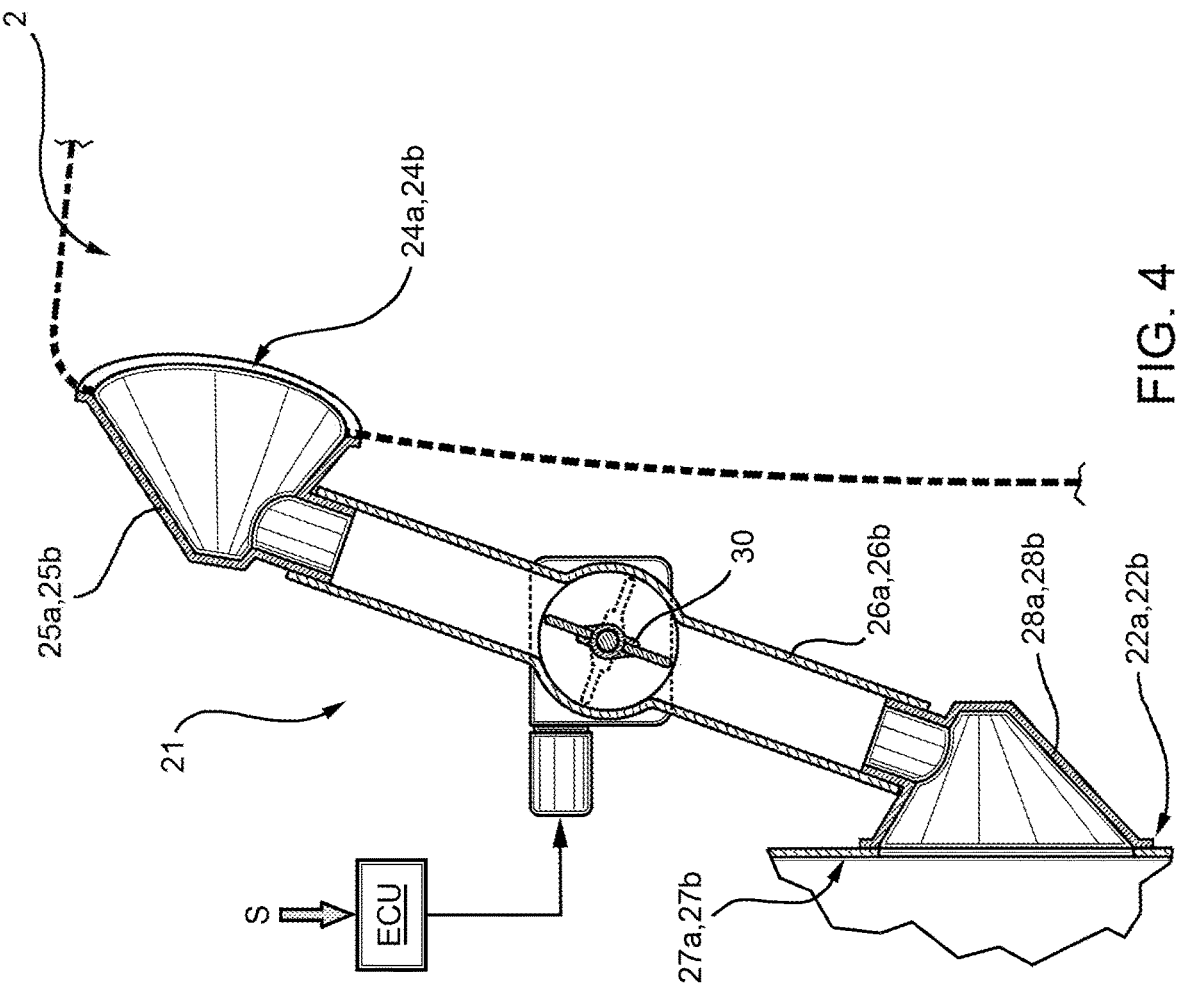
FIGS. 3 and 4 show, on a larger scale and in cross section, two details of the sound transmission system of FIG. 2.

With reference to FIG. 4, according to a preferred aspect of the invention, the sound transmission system 21 comprises at least one valve 30, which is controlled by an electronic control unit ECU so as to open/close said acoustic conduit 22a, 22b and/or so as to adjust a passage cross section along the acoustic conduit 22a, 22b. In the specific case shown herein, the valve 30 is arranged along the channel 26a, 26b and is defined, for example, by throttle valve. A complete obstruction of the passage by the valve 30 causes a blocking of sounds; on the other hand, a reduction in the passage cross section tends to reduce sound intensity. In particular, the control unit ECU open or closes the passage in relation to the need to hear sounds in the passage compartment or to the lack thereof, depending on the state of the vehicle.

Compared to the example shown herein, the valve 30 can be of a different type (for example, a gate valve or a slide valve) and/or be arranged in different positions (for example, in the area of the inlet mouths 23a, 23b), for example based on the spaces available in the motor vehicle and/or based on the requested response times and precision.

According to a further preferred aspect of the invention, the channels 26a, 26b and/or the sound boxes 27a, 27b have a volume and/or a shape that can be adjusted during the electric-drive operation, in order to change the tone and/or the timbre of the transmitted sound, in response to driving conditions detected, in use, by suitable sensors, for instance depending on the rotation speed of the motors 7 and 8, on the delivered torque and/or on similar vehicle quantities. In this way, drivers can pay attention to some predetermined operating modes, pointed out by the very sound emitted by the system 21.

Figures 5, 6:
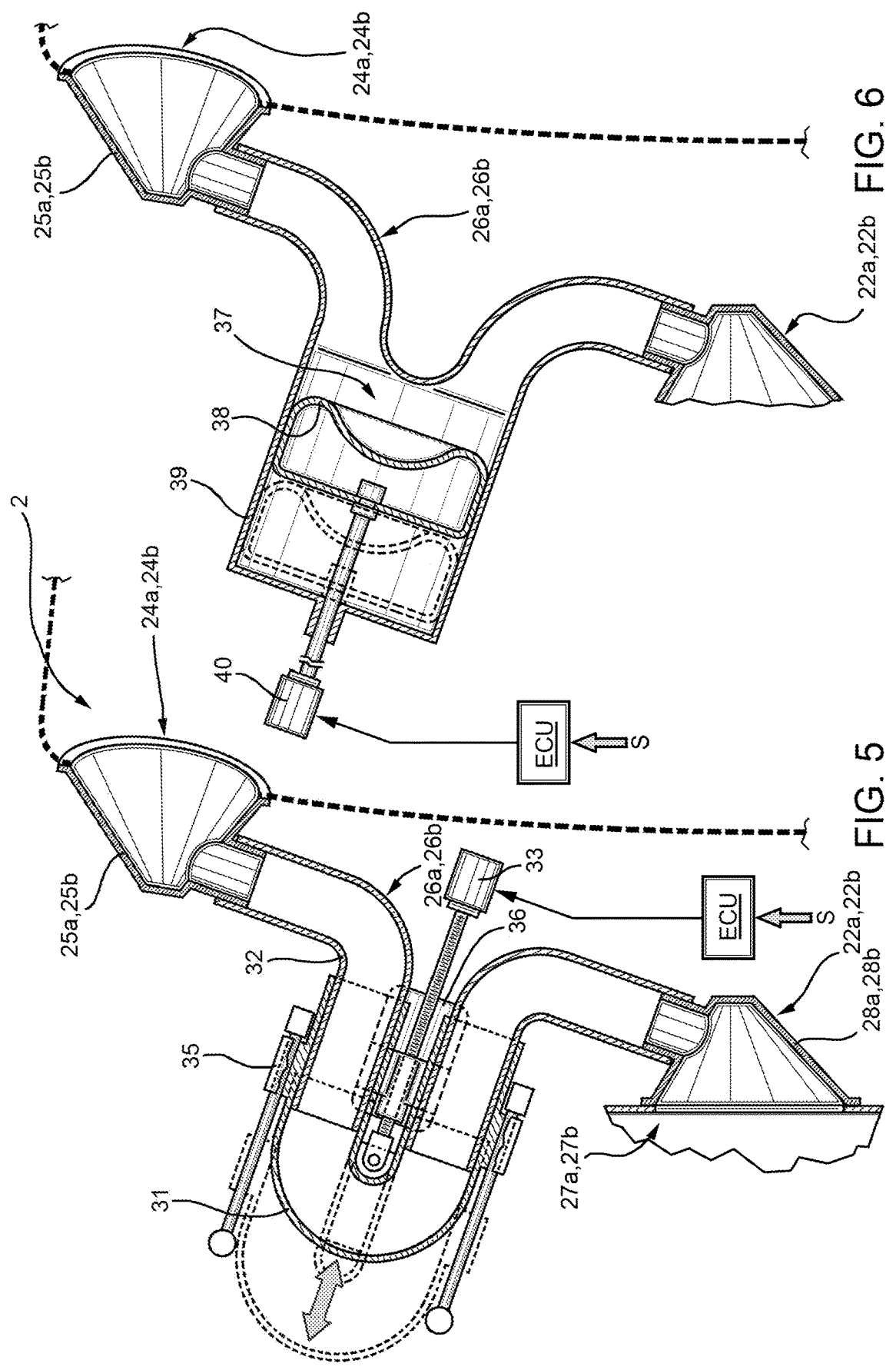
FIGS. 5 and 6 are similar to FIGS. 3 and 4 and show further embodiments of the sound transmission system according to the invention.

FIGS. 5 and 6 show two embodiments to be interpreted as merely indicative examples, since countless adjustment possibilities are available for a person skilled in the art. In the example of FIG. 5, the length of the sound transmission path can be increased/decreased by translating a movable portion 31 of the channel 26a, 26b relative to a fixed portion 32 thereof, by operating an actuator 33. The latter is controlled by the electronic control unit ECU in response to an electrical signal S indicative of the detected driving conditions, as indicated above. In particular, the movable portion 31 is coupled to the fixed portion 32 by means of a guide device 35; and the actuator 33 can be coupled to the movable portion 31 by means of a transmission 36.

In the example of FIG. 6, on the other hand, the channel 26a, 26b defines an inner chamber 37 arranged, for example, in the area of a recess in the sound transmission path and having a volume that can be increased/decreased by translating a piston 38 through the activation of an actuator 40, while said piston 38 is guided by a wall 39 of the channel 26a, 26b. Similarly to the preceding solution, the actuator 40 is controlled by the electronic control unit ECU in response to an electrical signal S indicative of the detected driving conditions. In particular, the inner chamber 37 could have dimensions that are sufficient to define a sound box, of the type with a variable volume, so that it could be used instead of the sound box 27a, 27b shown in FIGS. 2-5.

According to an embodiment which is not shown herein, the acoustic conduit according to the invention could be provided with an additional branch, which receives the sounds coming from the inlet mouths and transmits them to a further outlet opening, which is arranged outside the vehicle 1, so as to also serve as acoustic warning of the presence of the vehicle, in particular when pedestrians are near the vehicle.

Similarly to what disclosed above with reference to the accompanying figures, said additional branch could be associated with closing or reducing valves and/or with a sound box and/or with adjustment systems to change the tone and/or timbre of the transmitted sound.

Hence, in use, the driver perceives sounds that are emitted in the passenger compartment 2 by the system 21 through the outlet openings 24a, 24b and are characteristic of the operation of the axles 3, 4. In detail, the acoustic conduits 22a, 22b receive acoustic emissions from sound sources defined by components of the axles 3,4 and/or of the motors 7,8 and transfer said acoustic emissions, in a pneumatic manner, to the passenger compartment 2, adding an amplification operated by the sound boxes 27a, 27b at predetermined frequency intervals and, if necessary, a special setting of the tone and/or of the timbre (thanks to a proper design selection of the features concerning the shape, the dimensions and/or the materials of the sound boxes 27a, 27b and/or of the channels 26a, 26b). In this way, in the passenger compartment 2 it is possible to obtain sounds that have a sound intensity that is great enough to allow them to be appreciated by the driver and that, in addition, are deemed "pleasant", thus improving acoustic sensations while driving, without using electric-acoustic apparatuses and without using electronics for the treatment of the electrical signals transmitted by said apparatuses.

By means of suitable actuators and adjustment systems (like the ones shown, by mere way of example, in FIGS. 5 and 6), it is further possible to change the tone and/or the timbre of the sound emitted in the passenger compartment 2 by the system 21 during the use, in response to detected quantities (speed, acceleration, torque or load, etc.), which represent real-time driving conditions. These adjustments made to the acoustic conduit 22a, 22b allow for a further improvement in the acoustic sensations of the driver, in terms of driving pleasure and/or in terms of acoustic feedback response to driving manoeuvres.

Besides these advantages relating to the driver's sound perception, the system 21 is extremely simple and relatively compact (to this regard, the dimensions of the acoustic conduits 22a, 22b schematically shown in the accompanying figures are not drawn to scale). Moreover, the acoustic conduits 22a and 22b are particularly effective to transmit sounds that are characteristic of an electric drive, thanks to the positioning of the inlet mouths 23a and 23b in the area of the casings 10 of the motors 7 and 8, in particular in the area of the grids 11.

Finally, the motor vehicle 1 described above and shown in the accompanying figures can be subjected to changes and variants, which, though, do not go beyond the scope of protection set forth in the appended claims.

In particular, the number, the dimensions, the shape, the position and the structure of the components and/or the ways in which the acoustic conduits 22a, 22b can be adjusted could be different from the ones disclosed and shown herein by way of example.

The invention claimed is:

1. A vehicle comprising:
passenger compartment;
at least one axle comprising at least one wheel;
at least one electric motor to operate said at least one wheel;
wherein the vehicle further comprises sound transmission means to transmit sounds indicative of the operation of said at least one axle towards said passenger compartment;
wherein said sound transmission means comprise at least one acoustic conduit having:
at least one inlet mouth arranged at a sound source defined by said at least one axle and/or by said at least one electric motor,
at least one outlet opening arranged at said passenger compartment,
at least one channel to establish a communication between said at least one inlet mouth and said at least one outlet opening;
wherein said at least one electric motor defines said sound source and comprises an outer casing comprising a grid; and
wherein said at least one inlet mouth is arranged at said grid.

2. The vehicle according to claim 1, wherein said at least one inlet mouth is arranged in a position facing said grid.

3. The vehicle according to claim 1, wherein said at least one inlet mouth is coupled to said outer casing.

4. The vehicle according to claim 1, wherein said at least one acoustic conduit further comprises a resonance box arranged between said at least one inlet mouth and said at least one outlet opening.

5. The vehicle according to claim 4, wherein said resonance box is arranged at said at least one inlet mouth.

6. The vehicle according to claim 4, wherein said resonance box has a variable inner volume; said sound transmission means comprising a first actuator, which can be controlled so as adjust said inner volume.

7. The vehicle according to claim 1, wherein said at least one channel has a variable volume; said sound transmission means comprising a second actuator, which can be controlled so as adjust said volume.

8. The vehicle according to claim 7, wherein said at least one channel has a variable length in response to the action of said second actuator.

9. The vehicle according to claim 1, wherein said sound transmission means comprises at least one valve, which can be controlled so as to open/close said at least one acoustic conduit and/or so as to adjust a passage cross section area of said at least one acoustic conduit.

10. The vehicle according to claim 1, wherein said at least one outlet opening is defined by an element with a flared shape, diverging towards said passenger compartment.

11. The vehicle according to claim 1, wherein said at least one channel has an end inlet defined by an element with a flared shape, diverging towards said sound source.

* * * * *